United States Patent
Koeppl et al.

(10) Patent No.: US 8,487,592 B2
(45) Date of Patent: Jul. 16, 2013

(54) CIRCUIT AND METHOD FOR DE-ENERGIZING A FIELD COIL

(75) Inventors: Benno Koeppl, Markt Indersdorf (DE); Michael Scheffer, Munich (DE); Frank Auer, Roehrmoos (DE)

(73) Assignee: Infineon Technologies AG, Neubiberg (DE)

( * ) Notice: Subject to any disclaimer, the term of this patent is extended or adjusted under 35 U.S.C. 154(b) by 741 days.

(21) Appl. No.: 12/703,361

(22) Filed: Feb. 10, 2010

(65) Prior Publication Data

US 2011/0193533 A1 Aug. 11, 2011

(51) Int. Cl.
*H02P 9/10* (2006.01)

(52) U.S. Cl.
USPC .............................................. 322/59; 322/70

(58) Field of Classification Search
USPC ........... 322/44, 24, 59, 70; 323/351; 318/254; 307/10.1; 363/89; 327/108
See application file for complete search history.

(56) References Cited

U.S. PATENT DOCUMENTS

| | | | | |
|---|---|---|---|---|
| 4,748,532 A | * | 5/1988 | Commander et al. | 361/31 |
| 4,841,166 A | * | 6/1989 | Harnden | 327/110 |
| 5,233,509 A | * | 8/1993 | Ghotbi | 363/89 |
| 5,565,760 A | * | 10/1996 | Ball et al. | 322/23 |
| 5,656,922 A | * | 8/1997 | LaVelle et al. | 322/46 |
| 6,031,740 A | * | 2/2000 | Budmiger | 363/58 |
| 6,111,378 A | * | 8/2000 | LeMay et al. | 318/443 |
| 6,191,562 B1 | * | 2/2001 | Mueller et al. | 322/59 |
| 6,353,307 B1 | | 3/2002 | Koelle et al. | |
| 6,603,348 B1 | * | 8/2003 | Preuss et al. | 327/563 |
| 7,276,954 B2 | * | 10/2007 | Otoshi et al. | 327/423 |
| 7,436,154 B2 | * | 10/2008 | Asada | 322/24 |
| 2009/0058373 A1 | * | 3/2009 | Graovac et al. | 322/25 |
| 2010/0213985 A1 | * | 8/2010 | Bell | 327/108 |

FOREIGN PATENT DOCUMENTS

DE 198 35 316 A1 2/2000

* cited by examiner

*Primary Examiner* — Julio Gonzalez
(74) *Attorney, Agent, or Firm* — Slater & Matsil, L.L.P.

(57) ABSTRACT

A circuit includes a first half bridge including a first controllable semiconductor switch and a first diode. The first controllable semiconductor switch is coupled between a first constant supply potential and a center tap of the first half bridge. The first diode is coupled between the center tap and a constant reference potential. A second half bridge includes a second diode and a second controllable semiconductor switch. The second diode is coupled between a second constant potential higher than the first potential and a center tap of the second half bridge. The second controllable semiconductor switch is coupled between the center tap and the constant reference potential. Driver circuitry controls the conducting state of the first and the second semiconductor switch thus controlling the current flow through a field connectable between the center taps.

18 Claims, 2 Drawing Sheets

CIRCUIT AND METHOD FOR DE-ENERGIZING A FIELD COIL

TECHNICAL FIELD

The invention relates to a driver circuit for driving a field coil of a generator, especially an electric generator (alternator) for automotive applications.

BACKGROUND

During the operation of motor vehicle generators sudden surge voltages occur in response to a load dump because the magnetomotive force and the stored magnetic energy of the field coil of the generator can only be degraded at a finite rate. In common generator control circuits the field coil of a generator is de-energized by means of expensive components, such as power zener diodes, in order to prevent the output voltage of the generator to increase to high values which may cause damage to various electric components connected to the generator.

Various circuits for de-energizing field coils in order to reduce the magnetic energy stored therein are known in the art. Although such circuits may alleviate the problem of surge voltages that may occur especially in response to a load dump, there is still the need for improved circuits that allow a quick and reliable de-energization of field coils.

SUMMARY OF THE INVENTION

A circuit arrangement is disclosed. The circuit arrangement includes a first half bridge including a first controllable semiconductor switch and a first diode. The first controllable semiconductor switch is coupled between a first constant supply potential and a center tap of the first half bridge. The first diode is coupled between the center tap and a constant reference potential. A second half bridge includes a second diode and a second controllable semiconductor switch. The second diode is coupled between a second constant potential higher than the first potential and a center tap of the second half bridge. The second controllable semiconductor switch is coupled between the center tap and the constant reference potential. Driver circuitry controls the conducting state of the first and the second semiconductor switch thus controlling the current flow through a field connectable between the center taps.

Further a method for controlling the magnetic energy stored in a field coil of a generator is disclosed. During normal operation, current is supplied to the field coil thus generating a desired magnetic field. The current flows from a circuit node providing a first constant supply potential via the field coil to a terminal providing a constant reference potential. A load dump of a load coupled to the generator is detected. In case a load dump is detected, current supplied to the field coil stopped and a current path is provided from the terminal providing the constant reference potential via the field coil to a node providing a second constant potential higher than the first supply potential.

BRIEF DESCRIPTION OF THE DRAWINGS

The invention can be better understood with reference to the following drawings and description. The components in the figures are not necessarily to scale, instead emphasis being placed upon illustrating the principles of the invention. Moreover, in the figures, like reference numerals designate corresponding parts. In the drawings.

DETAILED DESCRIPTION OF ILLUSTRATIVE EMBODIMENTS

As mentioned above, sudden surge voltages may occur during the operation of generators in response to a load dump because the magnetomotive force (i.e., because of the stored magnetic energy of the field coil of the generator). For this reason, common generator control units include circuits for de-energizing the field coil thus considerably reducing the amplitude and the duration of the surge voltages.

Figure 1:
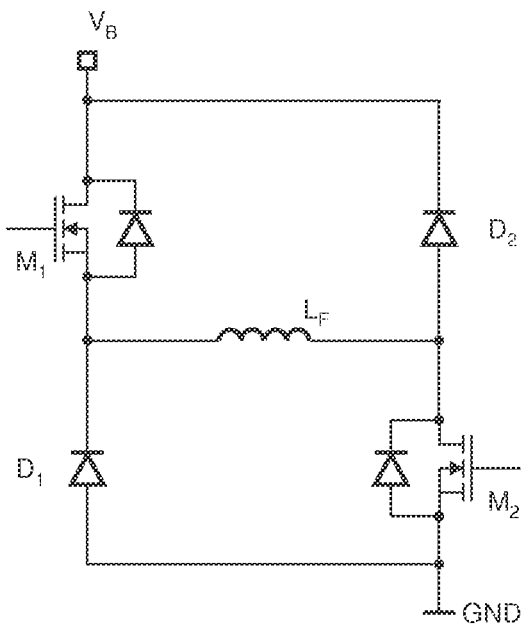
FIG. 1 is a circuit diagram illustrating a known H-bridge for controlling the magnetic energy stored in a field coil.

FIG. 1 illustrates a so-called H-bridge circuit for reducing the energy of a field coil. The circuit has two power switches M1, M2 which may be implemented, for example, as MOSFETs or other type of transistors. During normal operation of the circuit, both power switches $M_1$, $M_2$ are closed thus providing current from the system power supply (voltage $V_B$) to the field coil $L_F$ of the generator thus generating an exciting field. Thereby a certain amount of magnetic energy is stored in the coil $L_F$. The MOSFETs M1, M2 are usually driven by a pulse-shaped control signal such as, for example, a pulse-width-modulated (PWM) signal, for controlling the average current through the field coil. As long as the transistors $M_1$, $M_2$ are in a conducting state, current flows from the power system supply (voltage $V_B$) via power switch M1, field coil $L_F$, and power switch M2 to ground potential GND.

During a non-conduction state of transistor $M_1$, when transistor $M_1$ is driven in an off-state while transistor $M_2$ is still on, the current path $V_B$-$M_1$-$L_F$-$M_2$-GND is interrupted and the coil discharges via free-wheeling diode D1. The effective counter voltage present at the field coil $L_F$ during such a free-wheeling phase is the forward voltage of the free-wheeling diode D1, e.g., approximately 0.7 V.

However, in case of a load dump the magnetic energy stored in the coil has to be reduced more quickly than is achievable in the above-mentioned free-wheeling phase during normal operation. For a rapid de-energization of the magnetic energy of field coil $L_F$, both power switches M1 and M2 are driven into an off state (non-conduction state). In this case, the current flows via diode $D_1$, field coil $L_F$, and diode $D_2$. Thereby, current flows through the diodes $D_1$ and $D_2$ in a forward direction. Hence the current flows contrary to the direction of the voltage $V_B$ (for example, 14 V) of the system power supply augmented by the sum of the forward voltages of the diodes $D_1$ and $D_2$, i.e., a total of about 15.4 V. The counter-voltage required for this (approximately 15.4 V in the present example) is built up by the self-inductance of the field coil.

Figure 2:
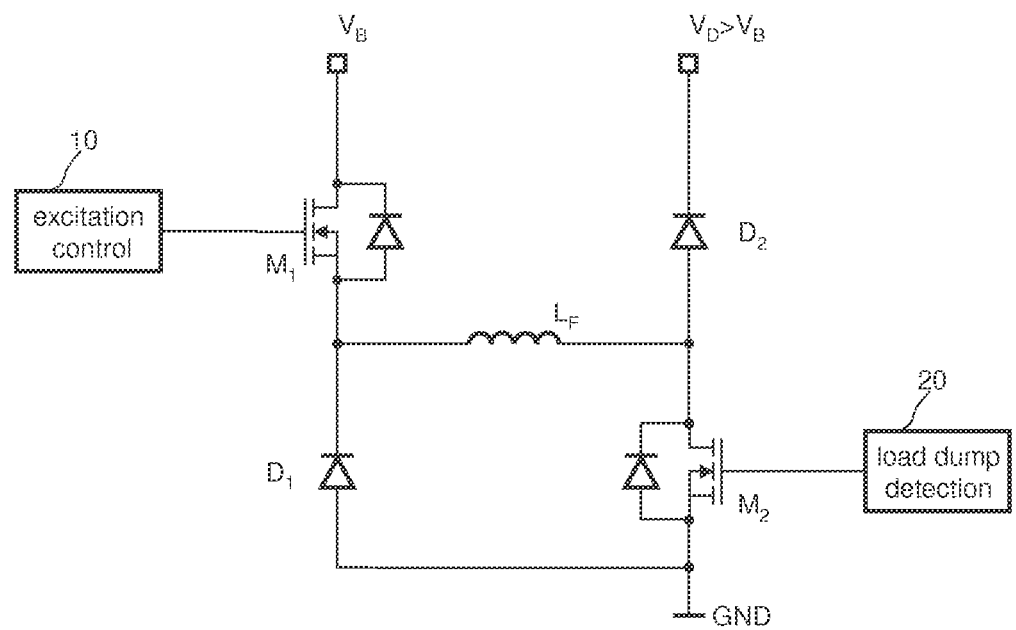
FIG. 2 is a circuit diagram illustrating a first example of the present invention wherein for de-energizing the coil a counter voltage is applied thereto which is higher in magnitude of a system voltage.

FIG. 2 is a block diagram illustrating an improved circuit for controlling the magnetic energy stored in a field coil $L_F$. Similar to the circuit of FIG. 1, the field coil $L_F$ (e.g., for generating an exciting field of a generator) is coupled between the center taps of two half bridges thus forming an H-bridge.

A first half bridge is connected between a terminal providing a constant first supply potential $V_B$ (e.g., from an automotive battery) and a terminal providing a constant reference potential GND. The first half bridge includes a series circuit of a first controllable semiconductor switch $M_1$ and a diode $D_1$. Thereby the first semiconductor switch $M_1$ is connected between the terminal providing the constant first supply potential $V_B$ and the center tap, whereas the first diode $D_1$ is connected between the center tap and the terminal providing the constant reference potential GND.

Similarly the second half bridge is connected between a terminal providing a constant second potential $V_D$ higher than the first potential $V_B$ and the terminal providing the constant reference potential GND. The second half bridge includes a series circuit of a second diode $D_2$ and a second controllable semiconductor switch $M_2$. Thereby the second Diode $D_2$ is connected between the terminal providing the constant second potential $V_D$ and the center tap whereas the second semiconductor switch $M_2$ is connected between the center tap and the terminal providing the constant reference potential GND.

One of ordinary skill will understand that the diodes D1, D2 might be replaced by other appropriate switching elements which provide the same function. Further, the controlled semiconductor switches may be implemented as, for example, MOSFETs, BJTs, IGBTs or other types of transistors.

In the example of FIG. 2, the switching state (on or off) of the first semiconductor switch $M_1$ is controlled by a first driver circuitry 10 that controls the current flow through the first semiconductor switch $M_1$ and thus the magnetic field provided by the field coil $L_F$. During normal operation the strength of the excitation field is controlled by modulating the driver signal supplied to a control terminal of the first semiconductor switch $M_1$. In many applications this modulation is a pulse width modulation. However, other types of modulation (pulse frequency modulation, pulse density modulation, etc.) may be appropriate. During such normal operation the second semiconductor switch $M_2$ is driven into an on state by a second driver circuitry 20 that is coupled to a control terminal of the second semiconductor switch $M_2$ and thus controls the current flow through it. Consequently, during normal operation the current through the field coil $L_F$ takes the current path $V_B$-$M_1$-$L_F$-$M_2$-GND or GND-$D_1$-$L_F$-$M_2$-GND dependent on the conduction state of the first semiconductor switch $M_1$.

In case of a load dump, i.e., in case an electric load suddenly disconnects from the generator that is excited by the field coil $L_F$, both semiconductor switches $M_1$ and $M_2$ are driven into an off state. Therefore the second control circuitry 20 is configured to detect such load dumps, for example, by monitoring the total load current provided by the generator. During this de-energizing mode of operation of the circuit of FIG. 2 the current through the field coil $L_F$ takes the current path GND-$D_1$-$L_F$-$D_2$-$V_D$, where $V_D$ is a constant potential higher than the system supply potential $V_B$. Thus the resulting counter voltage present at the field coil is $V_D + 2 \cdot V_F$ wherein $V_F$ is the forward voltage of the diodes $D_1$ and $D_2$. As in the present example the field coil $L_F$ de-energizes at a higher counter voltage (since constant potential $V_D$>system supply potential $V_B$) compared to the circuit of FIG. 1 the speed of de-energizing is improved.

Figure 3:
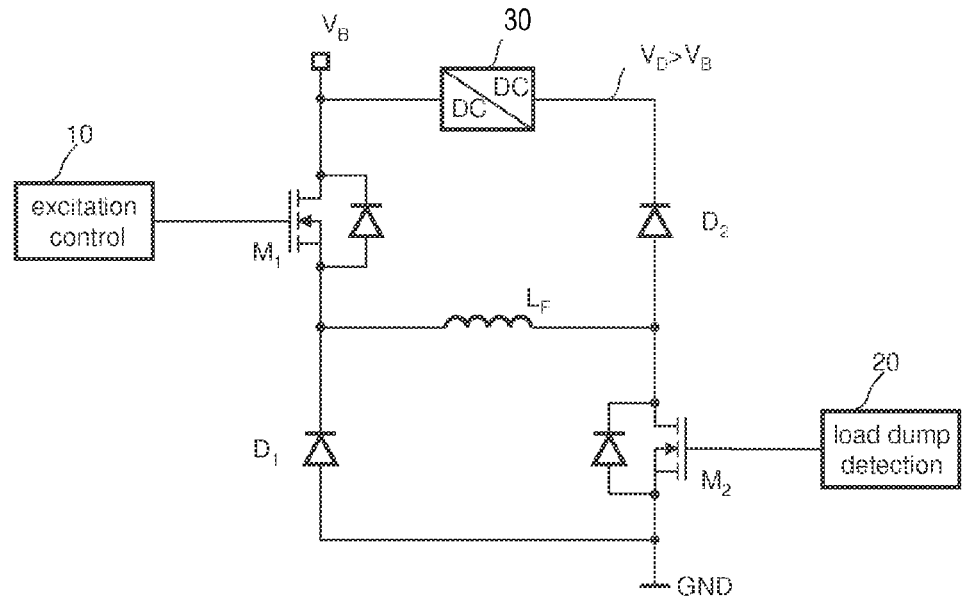
FIG. 3 is a circuit diagram illustrating the example of FIG. 2 in more detail.

The example illustrated in the circuit diagram of FIG. 3 is similar to the example of FIG. 2. However, the example of FIG. 3 includes one possibility of how to provide the high potential $V_D$. In the present example a DC/DC converter 30 is connected between the terminal providing the constant system supply potential $V_B$ and the terminal providing the constant potential $V_D$. As the potential $V_D$ is higher than supply potential $V_B$ the DC/DC converter may include a boost converter.

Figure 4:
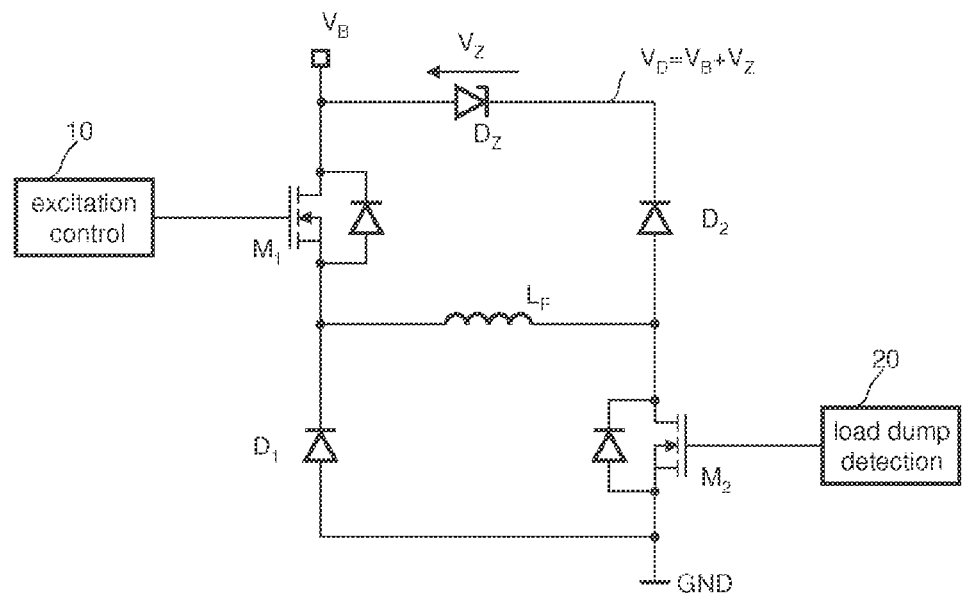
FIG. 4 is a circuit diagram illustrating an alternative to the circuit of FIG. 3.

An alternative to the example of FIG. 3 is illustrated in FIG. 4 by means of a further circuit diagram. In this example the boost converter 30 is replaced by a zener diode $D_Z$, which is connected between the terminal providing the constant system supply potential $V_B$ and the terminal providing the constant potential $V_D$. Thus, in the de-energizing mode of operation (see description above with reference to FIGS. 1 and 2) the constant potential $V_D$ equals the sum of supply potential $V_B$ and zener voltage $V_Z$. Thus, during this de-energizing mode of operation of the circuit of FIG. 4 the current through the field coil $L_F$ takes the current path GND-$D_1$-$L_F$-$D_2$-$D_Z$-$V_B$, wherein the potential present at the common node between diode $D_2$ and zener diode $D_Z$ is $V_D = V_B + V_Z$.

Although the present invention has been described in accordance to the embodiments shown in the figures, one of ordinary skill in the art will recognize there could be variations to these embodiments and those variations should be within the spirit and scope of the present invention. Accordingly, modifications may be made by one ordinarily skilled in the art without departing from the spirit and scope of the appended claims.

What is claimed is:

1. A circuit comprising:
   a first half bridge including a first controllable semiconductor switch and a first diode, the first controllable semiconductor switch being coupled between a first constant supply potential and a center tap of the first half bridge, the first diode being coupled between the center tap and a constant reference potential;
   a second half bridge including a second diode and a second controllable semiconductor switch, the second diode being coupled between a second constant potential that is higher than the first constant supply potential and a center tap of the second half bridge, the second controllable semiconductor switch being coupled between the center tap and the second constant potential; and
   driver circuitry for controlling a conducting state of the first semiconductor switch and the second semiconductor switch thus controlling current flow through a field connectable between the center taps.

2. The circuit of claim 1 further comprising:
   a field coil of a generator coupled between the center tap of the first half bridge and the center tap of the second half bridge;
   wherein the driver circuitry is configured to control an exciting field for the generator by providing a modulated driver signal to the first semiconductor switch during normal operation, and
   wherein the driver circuitry is further configured to detect a load dump and to drive the first and second semiconductor switches to an off state in case a load dump has been detected.

3. The circuit of claim 1, further comprising a DC/DC-converter coupled to the second half bridge and providing the second constant potential.

4. The circuit of claim 3, wherein the DC/DC-converter is coupled between the second constant potential and the first constant supply potential.

5. The circuit of claim 1, further comprising a zener diode coupled between a terminal providing the first constant supply potential and a terminal providing the second constant potential.

6. The circuit of claim 5, wherein the second constant potential is a sum of the first constant supply potential and a zener voltage of the zener diode.

7. A circuit comprising:
   a first voltage node for carrying a first supply voltage;

a second voltage node for carrying a second supply voltage, the second supply voltage greater than the first supply voltage;

a coil having a first terminal and a second terminal;

a first transistor coupled between the first voltage node and the first terminal of the coil;

a first diode coupled between the first terminal of the coil and a reference voltage node;

a second diode coupled between the second voltage node and the second terminal of the coil; and a second transistor coupled between the second terminal of the coil and the reference voltage node.

8. The circuit of claim 7, further comprising a DC/DC converter coupled between the first voltage node and the second voltage node.

9. The circuit of claim 7, further comprising a Zener diode coupled between the first voltage node and the second voltage node.

10. The circuit of claim 7, wherein the first voltage node comprises a terminal of an automotive battery.

11. The circuit of claim 7, further comprising drive circuitry coupled to a control terminal of the first transistor and a control terminal of the second transistor.

12. The circuit of claim 11, wherein the drive circuitry is configured to provide a modulated driver signal to the first transistor during normal operation.

13. The circuit of claim 12, wherein the drive circuitry is further configured to drive the first transistor and the second transistor to an off state in case a load dump has been detected.

14. The circuit of claim 7, further comprising a third diode coupled in parallel with the first transistor and a fourth diode coupled in parallel with the second transistor.

15. The circuit of claim 7, wherein the first supply voltage is about 14 volts and wherein the reference voltage node is a ground node.

16. A method for controlling magnetic energy stored in a field coil of a generator, the method comprising:

during normal operation, supplying current to the field coil thus generating a desired magnetic field, the current flowing from a circuit node providing a first constant supply potential via the field coil to a terminal providing a constant reference potential;

detecting a load dump of a load coupled to the generator; and when a load dump is detected, stop supplying current to the field coil and providing a current path from the terminal providing the constant reference potential via the field coil to a node providing a second constant potential that is higher than the first constant supply potential.

17. The method of claim 16, wherein the second constant potential is provided by a DC/DC converter.

18. The method of claim 16, wherein the second constant potential is provided by a zener diode coupled between a node providing the first constant supply potential and a node providing the second constant potential, the second constant potential being a sum of the first constant supply potential and a zener voltage of the zener diode.

* * * * *